(12) United States Patent  
Larter et al.

(10) Patent No.: US 6,689,857 B1  
(45) Date of Patent: *Feb. 10, 2004

(54) HIGH DENSITY POLYETHYLENE FILM WITH HIGH BIAXIAL ORIENTATION

(75) Inventors: John A. Larter, Canandaigua, NY (US); Robert V. Poirier, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/715,546

(22) Filed: Oct. 3, 1996

(51) Int. Cl.[7] .......................... C08F 10/14; B32B 27/08; B32B 3/26; B32B 1/14
(52) U.S. Cl. .................... 526/348.5; 428/500; 428/515; 428/516; 428/304.4; 428/307.3; 428/308.4; 428/910; 264/901; 264/902; 264/903; 264/299
(58) Field of Search .............................. 428/411.1, 500, 428/515, 516, 304.4, 307.3, 308.4, 910; 264/901, 902, 903, 299; 526/348.5

(56) References Cited

U.S. PATENT DOCUMENTS

| | | | |
|---|---|---|---|
| 4,191,719 A | 3/1980 | Jack et al. | 264/41 |
| 4,252,851 A | 2/1981 | Lansbury et al. | 428/336 |
| 4,380,567 A | 4/1983 | Shigemoto | 428/213 |
| 4,384,024 A | 5/1983 | Mitchell et al. | 428/349 |
| 4,565,739 A | 1/1986 | Clauson et al. | 428/349 |
| 4,578,316 A * | 3/1986 | Clauson et al. | 428/516 |
| 4,680,207 A | 7/1987 | Murray | 428/35 |
| 4,705,714 A * | 11/1987 | Itaba et al. | 428/215 |
| 4,855,187 A | 8/1989 | Osgood, Jr. et al. | 428/516 |
| 4,870,122 A | 9/1989 | Lu | 524/488 |
| 4,891,173 A | 1/1990 | Saitoh et al. | 264/22 |
| 4,891,176 A | 1/1990 | Drysdale et al. | 264/250 |
| 4,916,025 A * | 4/1990 | Lu | 428/516 |
| 5,006,378 A | 4/1991 | Itaba et al. | 428/34.9 |
| 5,066,434 A | 11/1991 | Liu et al. | 264/36 |
| 5,185,203 A | 2/1993 | Itaba et al. | 428/349 |
| 5,223,346 A * | 6/1993 | Lu | 428/516 |
| 5,241,030 A | 8/1993 | Barry et al. | 526/348.1 |
| 5,302,327 A | 4/1994 | Chu et al. | 264/22 |

(List continued on next page.)

FOREIGN PATENT DOCUMENTS

| | | |
|---|---|---|
| GB | 1176204 | 1/1970 |
| GB | 1287527 | 4/1970 |
| WO | PCT/US97/14916 | 8/1997 |
| WO | WO 9814491 A1 * | 4/1998 |

*Primary Examiner*—Holly Rickman  
(74) *Attorney, Agent, or Firm*—Rick F. James

(57) ABSTRACT

A high density polyethylene (HDPE) film is provided having high-biaxial orientation. The film includes HDPE having a density of at least about 0.940, and a melt index of from about 0.5 to about 10. The film is stretched in the machine (longitudinal) direction to a degree of from about 5:1 to about 8:1, preferably from about 6:1 to about 7:1. The film is also stretched in the transverse (lateral) direction to a degree of from about 6:1 to about 15:1, preferably from about 9:1 to about 13:1. Preferably, the film has an orientation imbalance, with a higher degree of transverse orientation than machine orientation. Skin layers such as heat seal layers can be provided. Preferably, the film contains one or more layers of a casting promoter material employed to promote casting of a high gauge HDPE sheet subsequently high biaxially oriented to provide the film. The film can also be cavitated, or otherwise modified (e.g., corona-treated, coated, metallized, etc.) to provide films suitable for special applications. The film of the invention has superior properties, including lower water vapor transmission rate, better dead-fold, higher tensile strength, and consistent gauge profile. Also provided is a method for making the biaxially oriented film.

41 Claims, 2 Drawing Sheets

U.S. PATENT DOCUMENTS

| | | | |
|---|---|---|---|
| 5,302,442 A | | 4/1994 | O'Brien et al. ............. 428/213 |
| 5,366,796 A | * | 11/1994 | Murschall et al. .......... 428/216 |
| 5,489,471 A | * | 2/1996 | Inoue et al. ............. 428/304.4 |
| 5,492,757 A | | 2/1996 | Schuhmann et al. ........ 428/329 |
| 5,500,283 A | | 3/1996 | Kirk et al. .................. 428/349 |
| 5,527,608 A | | 6/1996 | Kemp-Patchett et al. ... 428/349 |
| 5,558,930 A | | 9/1996 | DiPoto ....................... 428/216 |
| 5,573,717 A | * | 11/1996 | Peiffer et al. ............... 264/45.1 |
| 5,618,630 A | * | 4/1997 | Benoit et al. ................ 428/500 |
| 5,698,333 A | * | 12/1997 | Benoit et al. ................ 428/516 |
| 5,716,695 A | * | 2/1998 | Benoit et al. ................ 428/195 |
| 5,725,962 A | * | 3/1998 | Bader et al. ................. 428/515 |
| 5,891,555 A | * | 4/1999 | O'Brien ....................... 428/213 |

* cited by examiner

HIGH DENSITY POLYETHYLENE FILM WITH HIGH BIAXIAL ORIENTATION

BACKGROUND OF THE INVENTION

The invention relates to methods for preparing polymer films. Specifically, the invention relates to methods of biaxially orienting high density polyethylene films and the films prepared according to such methods.

Generally, in the preparation of a film from granular or pelleted polymer resin, the polymer is first extruded to provide a stream of polymer melt, and then the extruded polymer is subjected to the film-making process. Film-making typically involves a number of discrete procedural stages, including melt film formation, quenching, and windup. For a general description of these and other processes associated with film-making, see K R Osborn and W A Jenkins, *Plastic films: Technology and Packaging Applications*, Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch, and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength.

When a film has been stretched in a single direction (monoaxial orientation), the resulting film exhibits great strength and stiffness along the direction of stretch, but it is weak in the other direction, i.e., across the stretch, often splitting or tearing into fibers (fibrillating) when flexed or pulled. To overcome this limitation, two-way or biaxial orientation is employed to more evenly distribute the strengthalities of the film in two directions, in which the crystallites are sheetlike rather than fibrillar. These biaxially oriented films tend to be stiffer and stronger, and also exhibit much better resistance to flexing or folding forces, leading to their greater utility in packaging applications.

From a practical perspective, it is possible, but technically and mechanically quite difficult, to biaxially orient films by simultaneously stretching the film in two directions. Apparatus for this purpose is known, but tends to be expensive to employ. As a result, most biaxial orientation processes use apparatus which stretches the film sequentially, first in one direction and then in the other. Again for practical reasons, typical orienting apparatus stretches the film first in the direction of the film travel, i.e., in the longitudinal or "machine direction" (MD), and then in the direction perpendicular to the machine direction, i.e., the lateral or "transverse direction" (TD).

The degree to which a film can be oriented is also dependent upon the polymer from which it is made. Polypropylene, as well as polyethylene terephthalate (PET), and nylon, are polymers which are highly crystalline and are readily heat stabilized to form dimensionally stable films. These films are well known to be capable of being stretched to many times the dimensions in which they are originally cast (e.g., 5× by 8× or more for polypropylene).

High density polyethylene (HDPE) exhibits even higher crystallinity (e.g., about 80–95%) relative to polypropylene (e.g., about 70%), and HDPE-containing films are generally more difficult to orient biaxially than polypropylene films. U.S. Pat. Nos. 4,870,122 and 4,916,025 describe imbalanced biaxially oriented HDPE-containing films which are oriented up to about two times in the machine direction, and six times or more in the transverse direction. This method produces a film that tears relatively easily in the transverse direction. Multi-layer films prepared according to this method are also disclosed in U.S. Pat. Nos. 5,302,442, 5,500,283, and 5,527,608, the disclosures of which are incorporated herein by reference in their entireties.

British Patent No. 1,287,527 describes high density polyethylene films which are biaxially oriented in a balanced fashion to a degree of greater than 6.5 times in both the longitudinal dimension (i.e., MD) and the lateral dimension (i.e., TD). This method requires a specific range of orientation temperatures.

U.S. Pat. Nos. 4,891,173 and 5,006,378 each disclose methods for preparing HDPE films which requires cross-linking the film, with optional biaxial orientation of the cross-linked film. It is reported that the cross-linking process, which requires irradiation of the film, improves the film's physical properties. Other cross-linking processes, such as chemically-induced cross-linking, can have similar effects.

U.S. Pat. No. 4,680,207 relates to imbalanced biaxially oriented films of linear low density polyethylene (LLDPE) oriented by being stretched up to 6-fold in the machine direction, and up to 3-fold in the transverse direction but less than in the machine direction.

U.S. Pat. No, 5,241,030 describes biaxially oriented films of a blend of at least 75% of a linear ethylene/alpha-olefin copolymer, but no more than 25% HDPE. The film can be mono- or multi-layered, and can be biaxially oriented, i.e., stretched up to 8:1 in the machine direction, and up to 9:1 in the transverse direction.

U.S. Pat. No. 5,302,327 describes an anti-fogging, heat-sealable polypropylene film. The film includes a polypropylene core and a heat sealable layer of HDPE or ethylene copolymer. These bilayer films can be machine stretched up to 7×MD, coated or corona-treated to improve wettability, and then stretched up to 10×TD.

Blown films of HDPE having a ethylene-vinyl acetate heat seal coating used for food packaging but such films must have a thickness of about two mils to meet the water vapor transmission rate (WVTR) requirements for packaging suitable for dry foods such as cereals. Moreover, blown HDPE films do not exhibit the dead-fold properties desirable in food packages, particularly of the bag-in-box type.

In view of the above considerations, it is clear that existing methods for producing biaxially oriented HDPE films yield products which are deficient in desirable physical characteristics. Existing HDPE film-making methods generally require additional chemical components in the HDPE resin (e.g., cross-linking agents) and/or additional process steps (e.g., irradiation). Such limitations not only complicate production, but generally result in increased costs. Moreover, cross-linking tends to lower polymer crystallinity, resulting in higher WVTR and lower stiffness.

Accordingly, it is one of the purposes of this invention, among others, to overcome the above limitations in the production of biaxially oriented HDPE films, by providing an economical and relatively uncomplicated method of making biaxially oriented films which imparts superior characteristics to the films, without requirement for chemical additives such as cross-linking agents, and without requirement for supplemental processing steps such as irradiation of the film.

SUMMARY OF THE INVENTION

The present invention is a biaxially oriented high density polyethylene (HDPE) film and a method for making the film. The film includes HDPE having a density of at least about 0.940 (g/cm$^3$), preferably at least about 0.950, and a melt index of from about 0.5 to about 10, which has been stretched in the solid state to a degree of from about 5:1 to about 8:1 in the machine direction and to a degree of from about 6:1 to about 15:1 in the transverse direction, and which includes an orientation imbalance including a greater degree of orientation in the transverse direction than in the machine direction.

Preferably, the biaxiially oriented film is stretched to a degree of from about 6:1 to about 7:1 in the machine direction, more preferably the film is stretched to a degree of from about 6:1 to less than 6.5:1 in the machine direction. It is also preferred that the biaxially oriented film is stretched to a degree of from about 9:1 to about 13:1 in the transverse direction. A highly preferred biaxially oriented film is stretched to a degree of from about 6:1 to about 7:1 in the machine direction, and to a degree of from about 9:1 to about 13:1 in the transverse direction.

The biaxially oriented film preferably includes a base layer of the HDPE and at least one skin layer coextensively adhered thereto. Among the various types of skin layers known in the art, the film preferably includes a heat seal skin layer or an ink-receptive skin layer.

The biaxially oriented film of the invention can be produced as a laminated HDPE film, including a central HDPE base layer and further including an outer casting promoter layer coextensively adhered to a surface of a base layer. Preferably, the film includes a casting promoter layer adhered to each of the major surfaces of the HDPE base layer, providing a three-layer structure. The casting promoter layer generally includes any material, preferably a polyolefin, which promotes casting of the HDPE film. Preferably, the casting promoter decreases the casting temperature required to obtain a high quality cast sheet for the high biaxial orientation process. It is more preferred that, in addition to decreasing the casting temperature, the casting promoter improves the optical properties of the film, including providing increased gloss and reduced haze.

The casting promoter is preferably a polyolefin or a blend of polyolefins. For example, a medium density polyethylene material can be used. Alternatively, a blend of low density polyethylene and HDPE can be used. The casting promoter is preferably a copolymer or terpolymer of at least about 80% propylene and at least one other alpha olefin. More preferably, the casting promoter includes an ethylene-propylene copolymer or an ethylene-propylene-butylene terpolymer including at least about 80% propylene. One highly preferred casting promoter material is an ethylene-propylene copolymer including about 98% propylene and about 2% ethylene. Another highly preferred casting promoter is an ethylene-prdpylene-butylene terpolymer including about 3% ethylene, about 93% propylene, and about 4% butylene.

The casting promoter can be blended with a material which improves heat sealability. Preferably, the material included in the casting promoter is a low density polyethylene or an ethylene-vinyl acetate.

The biaxially oriented film can also be modified by means known in the art, including, for example, coated (in-line or off-line), flame- or corona-treated, or metallized. Moreover, the film can include an antioxidant, filler, particulate, dye, pigment, light stabilizer, heat stabilizer, anti-static agent, slip agent, antiblocking agent, abrasive, or other additive. In, a preferred case, the film has been cavitated during the film-making process:

The invention is also a method of making a biaxially oriented high density polyethylene (HDPE) film, including:
biaxially orienting in the solid state a HDPE sheet including HDPE having a density of at least about 0.940, preferably at least about 0.950, and a melt index of from about 0.5 to about 10, and wherein the biaxially orienting includes machine direction stretching the HDPE sheet to a degree of from about 5:1 to about 8:1, and transverse direction stretching the HDPE sheet to a degree of from about 6:1 to about 15:1,
thereby providing a biaxially oriented HDPE film having an orientation imbalance including a greater degree of orientation in the transverse direction than in the machine direction.

The biaxially orienting preferably includes sequentially stretching the HDPE sheet, by first machine direction stretching the RDPE sheet and then transverse direction stretching the HDPE sheet. Alternatively, the biaxially orienting process can include simultaneously machine direction stretching and transverse direction stretching the HDPE sheet.

The machine direction stretching preferably includes stretching the HDPE sheet to a degree of from about 6:1 to about 7:1 in the machine direction, more preferably including stretching the HDPE sheet to a degree of from about 6.5:1 in the machine direction. The transverse direction stretching preferably includes stretching the HDPE sheet to a degree of from about 9:1 to about 13:1 in the transverse direction. In a more preferred method, the machine direction stretching includes stretching the HDPE sheet to a degree of from about 6:1 to about 7:1 in the machine direction, and the transverse direction stretching includes stretching the HDPE sheet to a degree of from about 9:1 to about 13:1 in the transverse direction.

The method can further include laminating a skin material to the HDPE sheet, such that the skin material is coextensively adhered as a skin layer to a surface of the HDPE sheet, to provide a laminated HDPE sheet. Thus, the method can include depositing a skin layer of a heat seal material onto a surface of the HDPE sheet to provide a laminated HDPE sheet having heat seal properties. Alternatively, the method can include laminating an, ink-receptive material to the surface of the HDPE sheet, to provide a laminated HDPE sheet having enhanced ink retention properties. Other skin layers can also be employed. If a casting promoter is used in the preparation of the film the skin layer can be deposited on a surface of a casting promoter layer to yield a multilaminated structure. The method can include treating the biaxially oriented film to increase wettability and adhesion of coatings, e.g., inks.

The method can further include:
- co-extruding the HDPE together with a casting promoter to provide a laminated HDPE co-extrudate, wherein the casting promoter includes a polyolefin having a crystallinity lower than that of the HDPE, to provide a laminated HDPE co-extrudate including a HDPE layer and at least one casting promoter layer, and
- casting the laminated HDPE co-extrudate to provide a HDPE sheet for the biaxially orienting.

In a highly preferred case, the co-extruding involves co-extruding the HDPE with the casting promoter to provide a laminated HDPE sheet, having a central HDPE base layer and two outer casting promoter layers coextensive with and separated by the HDPE layer.

According to the method of the invention, the casting promoter is preferably a propylene copolymer or terpolymer including at least about 80% propylene with at least one other alpha olefin. More preferably, the casting promoter is an ethylene-propylene copolymer including about 98% propylene and about 2% ethylene or an ethylene-propylene-butylene terpolymer including about 3% ethylene, about 93% propylene and about 4% butylene. Alternatively, the casting promoter can be a medium density polyethylene or a blend of a low density polyethylene and a high density polyethylene.

The method can further include coating the HDPE film (either in-line or off-line), flame- or corona-treating the film, metallizing the film, or otherwise treating the film to obtain a particular property as desired. Moreover, the HDPE can farther include an antioxidant, filler, particulate, dye, pigment, light stabilizer, heat stabilizer, anti-static agent, slip agent, anti-blocking agent, abrasive, or other additive.

In another embodiment, the invention is a method for making a biaxially oriented high density polyethylene (HDPE) film, including:
a) casting a laminated HDPE co-extrudate including a HDPE base layer and a casting promoter layer, wherein the HDPE has a density of at least about 0.940 and a melt index of from about 0.5 to about 10, and the casting promoter is any material which permits low temperature casting of the co-extrudate to provide a high gauge HDPE sheet suitable for high biaxial orientation; and
b) biaxially orienting the HDPE sheet by stretching the HDPE sheet to a degree of from about 5:1 to about 8:1 in the machine direction and to a degree of from about 6:1 to, about 15:1 in the transverse direction to provide a biaxially oriented HDPE film having an orientation imbalance including a greater degree of orientation in the transverse direction than in the machine direction.

In still another embodiment, the invention is a method for making a high density polyethylene (HDPE) sheet, including:
co-extruding HDPE together with a casting promoter to provide a HDPE co-extrudate, wherein the HDPE has a density of at least about 0.940 and a melt index of from about 0.5 to about 10, and wherein the casting promoter includes a polyolefin having a rate of crystallization and a crystallinity lower than that of the HDPE,
casting the HDPE co-extrudate to provide a high gauge HDPE sheet suitable for high biaxial orientation to provide a biaxially oriented HDPE film.

In yet another embodiment, the invention is a biaxially oriented laminated film structure, including:
a) a base layer including high density polyethylene (HDPE) having a density of at least about 0.940 and a melt index of from about 0.5 to about 10, and
b) an outer layer coextensively adhered to the base material and including a polyolefin having a rate of crystallization and a crystallinity lower than that of the HDPE,
wherein the laminated film structure is high biaxially oriented, including having been stretched to a degree of from about 5:1 to about 8:1 in the machine direction and to a degree of from about 6:1 to about 15:1 in the transverse direction, such that the film has an orientation imbalance wherein the degree of orientation in the transverse direction is greater than the degree of orientation in the machine direction.

In still another embodiment, the method relates to making a cavitated high density polyethylene (HDPE) film. Here the method includes:
a) extruding HDPE having a density of at least about 0.940 and a melt index of from about 0.5 to about 10 and containing therein a cavitating agent to provide a HDPE extrudate;
b) casting the HDPE extrudate to provide a HDPE sheet;
c) biaxially orienting the HDPE sheet by stretching the HDPE sheet to a degree of from about 5:1 to about 8:1 in the machine direction and to a degree of from about 6:1 to about 15:1 in the transverse direction,
thereby providing a cavitated biaxially oriented HDPE film having an orientation imbalance comprising a greater degree of orientation in the transverse direction than in the machine direction.

It has now been discovered that these and other purposes can be achieved by the present invention, which provides a biaxially oriented high density polyethylene film having low water vapor transmission rate (WVTR), excellent gauge profile, high impact strength (relative to monoaxial oriented films), high tensile properties, high stiffness, and other physical properties which are markedly better than blown HDPE films. The films also have dead-fold characteristics which make them well suited for packaging of foods in bag-in-box operations conducted on vertical, form, fill and seal (VFFS) machinery. In other applications, the films of the invention have properties rendering them useful for manufacture of labels, e.g., pressure-sensitive labels, graphic arts materials, and, in general, paper substitutes. The film can beneficially be provided with one or more skin layers. For example, when provided with a heat-seal layer by co-extrusion or coating, the film of the invention is particularly suited for use in packaging, especially of dry foodstuffs. The method for producing the film employs conventional apparatus in a more efficient manner, and does not require chemical cross-linking agents, irradiation, or other complicating production means.

These and other advantages of the present invention will be appreciated from the detailed description and examples which are set forth herein. The detailed description and examples enhance the understanding of the invention, but are not intended to limit the scope of the invention.

BRIEF DESCRIPTION OF THE DRAWINGS

Preferred embodiments of the invention have been chosen for purposes of illustration and description, but are not intended in any way to restrict the scope of the invention. The preferred embodiments of certain aspects of the invention are shown in the accompanying drawings, wherein.

DETAILED DESCRIPTION OF THE PREFERRED EMBODIMENTS

Figure 1A:
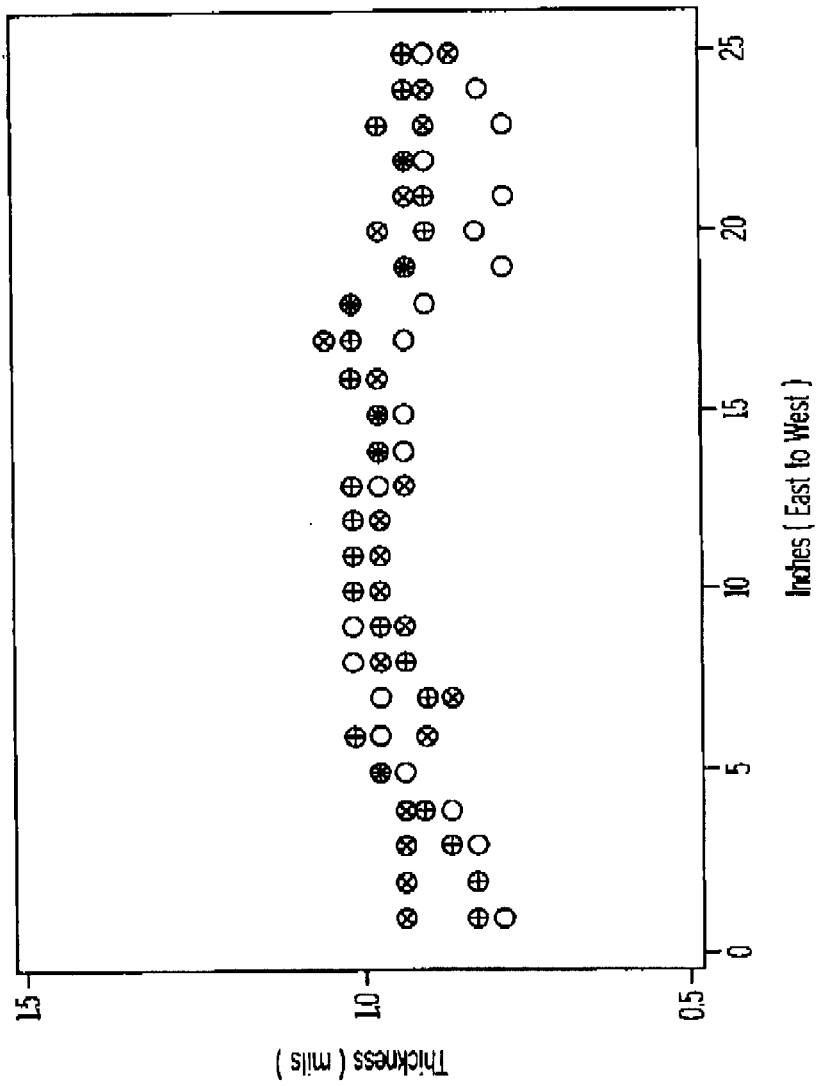
FIG. 1A is a graph illustrating the thickness of a film having balanced orientation measured across its width and at three different points along its length.

The present invention provides a biaxially oriented film of high density polyethylene (HDPE). As the term is used herein, "high density polyethylene" is defined to mean an ethylene-containing polymer having a density of 0.940 or higher. Generally, while HDPE having a density of 0.940 and above is acceptable for use, HDPE of higher density is preferred, with HDPE having a density of 0.950 or greater being more preferred. (As the density of HDPE increases from 0.940 to 0.960 and higher, tensile strength increases substantially, and the. WVTR drops substantially. Toughness and impact strength are much higher in the high molecular grades. K R Osborn and W A Jenkins, *Plastic Films: Technology and Packaging Applications*, Technomic Publishing Co., Inc., Lancaster, Pa. (1992).) While density is a parameter which usefully characterizes HDPEs, it is also recognized that the HDPE suitable for use in the invention generally has a crystalline melting point in the range of from about 265° F. (~130° C.) to about 280° F. (~137° C.), and a crystallinity of about 80–95%.

The melt index (MI) of the HDPE useful according to the invention is in the range of from about 0.5 to about 10. More preferably, the HDPE has a melt index in the range of from about 0.5 to about 2.0. Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The high density ethylene-containing polymers suited for use in the invention include not only homopolymers of ethylene, but also include copolymers of ethylene with higher alpha olefins. Suitable high density polyethylenes meeting the requisite criteria are available commercially.

Series of HDPE resins having ranges of physical properties are available from various manufacturers. A particularly preferred HDPE is the resin sold as M6211 by Lyondell Petrochemical Company, Houston, Tex. Other suitable HDPE resins include, for example, BDM 94-25 available from Fina Oil and Chemical Co., Dallas, Tex., and 19C and 19F available from Nova Corporation, Sarnia, Ontario, Canada.

HDPE useful according to the invention can include a copolymer of ethylene with a minor amount of another alpha olefin. Preferred alpha olefins include $C_3$–$C_8$ alpha olefins. Copolymers of ethylene (e.g., about 50% or more) with a minor amount of 1-propylene or 1-butylene are more preferred. By selecting the appropriate co-monomer, HDPE films can be manufactured having particular desired physical characteristics. For example, the crystallinity and density of the resulting copolymer can be controllably affected by the co-monomer employed with ethylene.

The HDPE can be composed exclusively of a single HDPE resin, a mixture (blend or alloy) of HDPE resins, or HDPE containing a minor proportion of other resource polymers (polyblend). For example, the HDPE can contain up to about 10 percent by weight (wt %) microcrystalline wax, to improve processability. These HDPEs typically have melt indices in the range of from about 0.5 to about 10, and they are usually selected to result in a blend having the desired melt index, e.g., from about 0.7 to about 2. A mixture of HDPE resins generally results in better processing characteristics in the extruder by reducing extruder torque.

The HDPE blends can include two or more HDPEs, each of which preferably has a density of 0.940 or greater. Blends of HDPE polymers advantageously include a major proportion (i.e., 50 wt % or more) of a HDPE having a melt index of 0.5 to 2, and one or more polymers having different melt indices. For example HDPE terblends have been found to be suitable for use according to the invention. Suitable terblends can, for example, include 50 to 98 wt %, preferably 84 to 96 wt % of HDPE having a density of 0.940 or higher and a melt index of greater than 0.5 to about 2.0; 1 to 25 wt %, preferably 3 to 8 wt % of HDPE having a density of 0.940 or greater and a melt index of 0.1 to 0.5, and 1 to 25 wt %, preferably 3 to 8 wt %, of HDPE having a density of 0.940 or higher and a melt index of greater than 2 to about 8. Preferably, the second and third HDPE polymers, which are minor components, are present in about equal amounts. Other HDPE blends and terblends can also be used.

Blends (alloys, polyblends) of HDPE with a minor amount of one or more other polymers are also useful in particular situations. For example, the physical properties of the resulting film can be selected by including polymers of varying crystallinity. Thus, high crystallinity polymers such as polypropylene can be included. Alternatively, lower crystallinity or amorphous polymers, such as polystyrene, styrene-butadiene copolymer, or polyvinyl acetate, can be included. U.S. Pat. No. 4,191,719, for example, describes HDPE materials which are blends including five different components. In this embodiment, the basic HDPE material includes at least about 50 wt % HDPE, and preferably at least about 90 wt % HDPE.

In another alternative, the film can include a base material which is a blend of HDPE and another polyethylene such as a low density PE (LDPE), ultra-low density PE (ULDPE), or a linear low density PE (LLDPE). The skilled artisan will understand that these other types of polyethylene can be employed in minor amounts to adjust the physical properties of the resulting films for particular purposes. In this embodiment, the base material includes at least about 50 wt % HDPE, and preferably at least about 90 wt % HDPE.

The film of the invention is biaxially oriented to a relatively higher degree than has been previously possible. The high degree of biaxial orientation of the HDPE film is an important aspect of this invention inasmuch as the proper degree of orientation has been found to impart desirable physical properties to the resulting film. Specifically, the orientation method of the invention introduces to the film such desirable properties as excellent WVTR characteristics, flex-crack resistance, elongation, tensile strength, impact strength and cold strength, which properties can all be measured by means of standard techniques known in the art. See, for example, 1994 *Annual Book of ASTM Statidardy*, American Society for Testing and Material, Philadelphia, Pa. (1994); or *TAPPI Test Methods* 1994–1995, TAPPI Press, Atlanta, Ga. (1994). The film of the invention also possesses better dead-fold properties. Dead-fold is generally assessed by qualitative means, but can he indicated by crease retention as determined by ASTM D-920-49 (% crease retention after 30 sec). These improved physical properties make the film of the invention ideally suited for packaging, even for packaging foods and other materials containing liquids. These physical properties also make the films well suited for use in labels and other similar applications.

The film of the invention is biaxially oriented in the solid state. The biaxial orientation includes stretching the film to a degree of from about 5:1 to about 8:1 in the machine direction. Preferably, the film is stretched to a degree of from about 6:1 to about 7:1 in the machine direction. More preferably, the film is MD stretched to a degree of from about 6:1 to less than 6.5:1. The film of the invention is also stretched in the transverse direction, to a degree of from about 6:1 to about 15:1. It is preferred that the film is stretched to a degree of from about 9:1 to about 13:1 in the transverse direction.

The skilled artisan will recognize that a HDPE film might be prepared so that the biaxial orientation is balanced, i.e., stretched to a substantially equal degree in both the TD and the MD. However, it has been unexpectedly found that a highly biaxially oriented HDPE film benefits from imbalanced orientation, i.e., biaxial orientation in which TD orientation and MD orientation are unequal. More specifically, the film benefits from an orientation imbalance in which the film has been stretched to a greater degree in the transverse direction than in the machine direction.

The properties of the film can be selectively controlled by adjusting the stretch ratio of the film, which is defined as the ratio of the degree of transverse direction stretch (TDX) to the degree of machine direction stretch (MDX), i.e., the ratio TDX/MDX. Thus, a film which is stretched in the MD to a degree of about 6:1 and in the TD to a degree of about 9:1, will have an stretch ratio of about TDX/MDX=9/6, or about 1.5. (A balanced film would have an stretch ratio of about 1.)

Accordingly, it is preferred that the film of the invention have an orientation imbalance, i.e., that it be oriented to a greater degree in the transverse direction and to a lesser degree in the machine direction. Thus, the film preferably has a TDX/MDX ratio greater than 1. For example, a film of the invention can be stretched in the machine direction to a degree of up to 6.5:1, and stretched in the transverse direction to a degree of about 10.5:1, to provide a TDX/MDX ratio of about 1.6.

The skilled artisan will appreciate from the disclosure provided herein that the film of the invention is not only of imbalanced orientation, but that the imbalanced film is oriented to a high degree in both directions. Thus, the film of the invention is said to have "high biaxial orientation." More descriptively, the film of the invention can be said to have "imbalanced high biaxial orientation."

Accordingly, the high biaxial orientation of a film prepared according to the invention implies that the film has been dimensionally altered to a high degree. This dimensional alteration is manifested as an relatively large increase in the surface area of the film. The resultant increase in surface area is substantially equal to the product of the stretch factors. Take, for example, a HDPE film which has been oriented according to the invention by stretching by a factor of 6:1 (i.e., 500% increase) in the MD and stretching by a factor of 9:1 (i.e., 800% increase) in the TD. In this example, the surface area of the film is 6×9=54 times the surface area of the original sheet (5,400% of the original).

The dimensional alteration manifested by an increase in the surface area is generally accompanied by a concomitant decrease in the gauge (thickness) of the film. The decrease in gauge is directly proportional to the product of the stretch factors, and is usually substantially equal to that number. Accordingly, in the example above, the final film gauge following the biaxial orientation procedure is generally about 6×9=54 times smaller than the gauge of the original HDPE sheet. Thus, to produce a film having a final thickness of 1.0 mil, oriented 6 MD×9 TD, the original material immediately prior to orienting should be about 54 mil thick. Because of the high degree of biaxial orientation, therefore, the sheet to be oriented must typically be of high gauge. The high biaxial orientation process of the invention permits dimensional alterations of from about 30 to about 120. Thus, as a general rule, a high gauge HDPE sheet is a sheet which is from about 30 to about 120 times thicker than the HDPE film intended to be produced, depending upon the MD and TD stretch factors being employed.

The film of the invention is produced (in preparation for orientation) using conventional casting apparatus. For example, cast extrusion is generally accomplished using a standard multi-roll stack system or a cast roll with an air cap (high velocity air applied to the outside of the sheet). Other casting apparatus is also useful, such as a cast roll and water bath system, although this type of system can affect film clarity, generally yielding a rougher and more opaque film.

Following casting, the cast material, typically a thick sheet, is oriented using conventional orienting apparatus. Preferably, the sheet is oriented sequentially, more preferably being stretched first in the machine direction and then being stretched in the transverse direction. Thus, the cast material is typically heated (optionally including a pre-heating stage) to its orientation temperature and subjected to MD orientation between two sets of rolls, the second set rotating at a greater speed than the first by an amount effective to obtain the desired draw ratio. Then the mono-axially oriented sheet is TD oriented by heating (again optionally including pre-heating) the sheet as it is fed through an oven and subjecting it to transverse stretching in a tenter frame. Alternative stretching approaches are also possible, including employing apparatus capable of simultaneous stretching, or stretching sequentially first in the transverse direction and then in the machine direction, but these approaches are less preferred, since they often suffer from serious technical limitations which presently render them either impracticable or overly expensive.

For the present invention, the high biaxial orientation processes, including any preheating step as well as the stretching step, are performed using equipment temperatures in the range of from about the glass transition temperature ($T_g$) of the HDPE to above the crystalline melting point ($T_m$) of the HDPE. More specifically, MD orientation is conducted at a temperature of from about 140° F. to about 320° F., more preferably from about 230° F. to about 295° F. TD orientation is accomplished at a temperature of from about 230° F. to about 320° F., more preferably, from about 255° F. to about 295° F. The skilled artisan will understand that the orientation temperature employed in a particular situation will generally depend upon the residence time of the sheet and the size of the rolls. Apparatus temperature higher than the $T_m$ of the HDPE sheet may be appropriate if the residence time is short. The skilled artisan also understands that the temperatures involved in these processes are in relation to the measured or set temperatures of the equipment rather than the temperature of the HDPE itself, which generally cannot be measured directly.

The overall thickness of the biaxially oriented film is not critical, and can range from about 0.25 mil to about 10.0 mil. However, it is another advantage of the process of the invention that the resultant film has excellent gauge profile, even in films of thicknesses less than 1 mil. Films of 0.7 mil have been produced having excellent gauge profile, in addition to other superior properties. For example, it has been determined that the films of this invention having a thickness of from about 0.25 mil to about 2 mil will have excellent WVTR (g-mil/100 in$^2$-24 hr-1 atm) of less than about 0.2/mil, whereas a somewhat heavier gauge (1.5 times thicker or more) is needed in a blown HDPE film to achieve a comparable WVTR. Although higher density HDPE resin having a density of 0.957 or greater can be made directly into thin films by cast extrusion, problems of curling, uniformity, flatness and high WVTR have remained as obstacles. Accordingly, thin HDPE films of about 0.8 to 1.5 mils having the best balance of properties, particularly for VFFS applications, are obtained in the highly biaxially oriented films of this invention when prepared from extrudates having a thickness of from about 15 mi to about 200 mil, which are reduced to the desired film gauge by biaxial orientation according to the invention. Generally, irrespective of actual thickness, the HDPE material at any stage between casting and completion of the requisite biaxial orienting is herein referred to as a sheet, while the HDPE material is referred to as a film following the biaxial orienting.

The biaxially oriented HDPE film of this invention can beneficially be provided with at least one skin layer coextensively adhered to a base material including the HDPE. Processes are known for manufacturing films having multiple layers, including up to five or more such layers. Skin layers can be employed to obtain desirable properties in these films. In particular embodiments, e.g., for packaging applications, it may be preferred that the film include a heat seal layer. For printing applications or label applications, a skin layer which improves printability (e.g., receptivity to inks) may be desirable. For example, an acrylate layer may be desirable to improve receptivity to acrylic-based inks. Other layers can be made of polymers having desirable barrier properties for gases such as oxygen. Methods for applying such skin layers to olefinic films are known in the art, as are skin layer materials suitable for adapting such films to different purposes.

Skin layers can be applied to the HDPE film in various ways. Skin layer materials can be applied to the base HDPE material during extrusion, after extrusion but prior to orientation, between sequential orientation steps, or even following completion of the requisite biaxial orientation. Methods of manufacturing multilayer film structures (laminated structures) include, for example, co-extrusion, in which two or more polymer melts are extruded together without the melts mixing to a significant extent. The resulting co-extrudate possesses a laminar structure. Another lamination method is extrusion lamination, in which a coating layer is extruded onto a preformed base sheet. Another method is co-lamination, in which a base layer and a skin layer are nipped into intimate contact and then subjected together to orientation. This type of method can employ base layers and skin layers prepared off-line. Alternatively, a base layer can be oriented in one direction, a skin layer then applied, and the composite material then oriented in the other direction. In adhesive lamination, an intermediate adhesive or bonding layer is provided between abase film and the desired coating layer. Alternatively, when additional lamina(s) are added to a previously extruded film, the surface of the film can be prepared to receive the added lamina(s) by pretreatment according to known methods, including chemical oxidation, flame treatment, corona discharge, and the like. Laminating methods which can be adapted for use with the films of the invention are described, for example, in U.S. Pat. Nos. 4,916,025, 5,223,346, 5,302, 442, 5,527,608, and 5,500,283, the entire disclosures of which are all incorporated herein by reference. The skilled artisan will appreciate the various modes of lamination and their utility to the application of particular types of skin layers.

In a multi-layer film, in which the HDPE constitutes a base or core layer, one or more layers or skins can be applied to one or both surfaces of the film. In such cases, the HDPE base layer will usually represent from about 70% to about 95% of the thickness of the overall film, or even a higher percentage thereof. Most commonly, such other layers are applied by being co-extruded thereon, e.g., co-extruded from a conventional extruder through a flat sheet die, the melt streams being combined in an adapter and/or a multicavity die prior to extrusion. Upon extrusion from the die, the laminate structure is chilled and quenched, and then subjected to the high biaxial orientation process. Finally, the edges of the film can be trimmed, and it is then wound on a roll.

If a heat seal layer is desired, the layer can be made from any of the conventional materials used for this purpose in conjunction with polyolefin, particularly polyethylene, films. For example ethylene-vinyl acetate copolymers or ethylene-methacrylic acid salt ionomers (e.g., available from Dupont under the trademark SURLYN) can be used. Films in which the heat seal layer is a bethylene-aethacrylic acid salt ionomer have been found to be particularly useful i n preparing films which are suitable for VFFS applications. The heat seal layer can include the heat seal resin as such or can include small amounts of other materials. For example, the relatively costly SURLYN ionomer can be mixed with small amounts of less costly materials such as low density polyethylene.

Various skin layers can be applied to satisfy the requirements for other applications. For example, methods are known for making films adapted for use in printing, e.g., films having enhanced printability useful for making labels and paper substitutes. Skin layers which improve receptivity to or retention of inks, including water-based inks, and are suitable for use in preparing labels, whether opaque or transparent, are described in commonly owned application Ser. No. 08/164,598, filed Dec. 9, 1993, now U.S. Pat. No. 6,455,150, disclosure of which is incorporated herein by reference in its entirety. Acrylate skin layers can be employed to improve retention of acrylic-based inks.

The film of the invention can also be metallized according to methods known in the art. For example, one such method for applying a metallized skin layer to the HDPE film is described in commonly owned patent application Ser. No. 08/455,734, filed May 31, 1995, now U.S. Pat. No. 5,725, 962, the disclosure of which is incorporated herein by reference in its entirety. Such metallized films can replace metallic foils in many applications.

Additives can also be incorporated into the polymeric materials of the film, either in the HDPE base material or in a skin layer if any. Numerous such materials are known, and numerous methods for their incorporation into films are known as well. Suitable additives include, without limitation, antioxidants, fillers, particulates, dyes, pigments, light stabilizers, heat stabilizers, anti-static agents, slip agents, anti-blocking agents, abrasives, and the like.

Opacifying agents can be included in the biaxially oriented HDPE film of the invention. Such agents are typically included in a proportion of up to about 10 wt %, preferably at least about 1 wt %. Such agents can be included in the HDPE resin prior to extrusion. Suitable opacifying agents include, e.g., iron oxides, carbon black, aluminum, aluminum oxide, titanium dioxide, and talc.

In an especially preferred embodiment, cavitating agents or void initiating particles are included in the film in amounts up to about 25 wt %. Such agents are typically added to the HDPE melt prior to extrusion and are capable of generating voids (cavities) in the structure of the film during the film-making process. It is believed that small inhomogeneities introduced into the HDPE by the cavitating agent result in points of weakness in the sheet. The biaxial orienting process then induces small tears in the HDPE, causing cavitation in the processed film. Suitable cavitating agents, include, for example, finely ground inorganic materials. One preferred cavitating agent is calcium carbonate ($CaCO_3$). Organic cavitating agents are also known, but are generally less preferred due to their limited operating temperature range. However, such organic cavitants may be useful if they are extremely finely divided and are either resistant to melt at operating temperatures or produce a suitable inhomogeneity in the HDPE material. Cavitating agents can be included using methods known in the art, such as that described in application Ser. No. 07/993,983, now abandoned the entirety of which is incorporated herein by reference. Accordingly, in the method of the invention in which a cavitating agent is employed, $CaCO_3$, polystyrene, or other cavitant can be included in an amount of from about 5 wt % to about 25 wt % in a core of HDPE. Applicants are not presently aware of any commercially practicable process for making biaxially oriented, cavitated HDPE films. It is, therefore, another advantage of the invention that the method is useful for making cavitated films exhibiting physical properties (e.g., improved gauge control) which are substantially better than previously possible.

The film can be treated to improve its wettability and adhesion to coatings such as, for example, inks. Such treatments are conventional and known in the art, for example, exposing the film to corona discharge, flame treating, and the like.

As noted hereinabove, the high biaxial orientation employed in the invention requires use of cast HDPE sheets having substantially higher thicknesses than are currently used for monoaxial orientation. For example, for a film which is MD stretched to a degree of 6:1 and TD stretched to a degree of 10:1, the film is reduced in thickness by a dimensional factor proportional to the product of the MD stretch and the TD stretch, or ~60. In this example, the cast sheet should have a thickness at least about 60 times the desired thickness of the biaxially oriented film. Accordingly, in the case where a film is desired to be 1 mil thick, the cast sheet must be about 60 mil thick. By contrast, for a 10×monoaxially oriented film having a thickness of 1 mil, the cast sheet would only have to be about 10 times as thick or about 10 mil.

Applicants have found that such high gauge HDPE sheets pose specific handling problems in their preparation. In particular, the high gauge HDPE sheets are so thick that cooling on the cast rolls is difficult to accomplish efficiently. Use of a relatively low cast roll temperature, e.g., ~140–160° F., which would otherwise be acceptable for handling a thinner HDPE sheet, tends to result in curling of the thicker sheet away from the cast roll. Also, such lower temperatures often cause roughened and uneven edges, leading to problems of tearing. Despite such problems, it has unexpectedly been found that the casting process can be beneficially modified to provide sheets having the desired characteristics for biaxial orienting procedures.

Applicants have made a surprising observation that a much higher cast roll temperature, e.g., ~200° F. or higher, can be used to keep the sheet adhered to the cast roll such that curl is avoided and suitable edges are formed, thereby making the subsequent orientation procedure feasible. However, while this approach does produce high gauges sheets suitable for use in the high biaxial orientation process, the high casting temperatures introduce practical difficulties into the casting process itself. For example, a high cast roll temperature diminishes the net temperature difference between the cast roll and the film, thereby reducing the rate of heat transfer out of the film. Moreover, higher cast roll temperatures impose disadvantages in the use of a water bath for cooling the film, since the water removes a great deal of heat from the roll, making maintaining the cast roll temperature difficult. Also, the higher temperatures cause significant increases in mineral deposits left on the machinery (and potentially transferable to the film) by evaporated water from the bath.

Alternatively, it has unexpectedly been found that curling of the HDPE sheet can be avoided, even when a lower temperature cast roll is used, if the HDPE being cast is provided with an outer layer of a casting promoter material. A casting promoter is a material which promotes the casting process by substantially improving the casting characteristics of the HDPE material to avoid some or all of the problems described herein. For example, use of a casting promoter, among other things, reduces or eliminates curling of the sheet and improves edge uniformity during casting while simultaneously permitting the use of substantially lower casting temperatures. Such casting promoter materials improve the processing capability for the sheet apparently by permitting optimization of the rate of heat transfer from the sheet without engendering defects such as curling, etc. Accordingly, any material which promotes the casting of a high gauge HDPE sheet is suitable for use as a casting promoter.

The casting promoter is preferably a polyolefinic material, i.e., a homopolymer, copolymer, or terpolymer of an alpha olefin, or a blend of polymeric materials comprising a major proportion of one or more polyolefins. It is believed that the casting promoter may act to maintain the sheet on the cast roll by reducing shrinkage of the sheet during the cooling process. The rate of shrinkage is believed to be related to the rate of crystallization and the degree of crystallinity in the casting promoter polymer. Thus, the casting promoter is preferably a polyolefinic material which exhibits lower shrinkage than the HDPE. Accordingly, the casting promoter should have a rate of crystallization and a degree of crystallinity which is lower than that of the HDPE. Since the crystallinity of a polyolefin generally correlates with its density, the density of the casting promoter typically is lower than that of the HDPE. Preferably, the density of the casting promoter material is below about 0.945. For example, medium density polyethylene material (e.g., Dowlex 2027 (d=0.942) from Dow Chemical Co. Midland, Mich.) can be used as a casting promoter according to the invention. Alternatively, a blend of low density polyethylene and HDPE can be used. For example, LDPE/HDPE blends containing from about 2 wt % to about 50 wt % HDPE, preferably from about 5 wt % to about 25 wt % HDPE, have proven capable Of functioning as casting promoter materials.

Preferred casting promoter materials include copolymers or terpolymers of a major proportion of propylene with a minor proportion of at least one other alpha olefin. More preferably, use of a copolymer of propylene and ethylene, or a terpolymer of propylene, ethylene, and butylene, will yield a high quality film according to the invention. An ethylene-propylene copolymer containing about 80% propylene and up to about 20% ethylene, preferably from about 2% to about 2:5% ethylene, and more preferably about 2% ethylene, has excellent casting promoter qualities. This material has also been found to substantially improve the clarity (lower haze) and gloss properties of the film. Ethylene-propylene-butylene terpolymers containing at least about 80% propylene, preferably containing from about 2% to about 7% ethylene, and more preferably about 3% ethylene, and containing from about 2% to about 7% butylene, preferably about 4% butylene, are also excellent casting promoters. These materials too have been found be useful and to impart beneficial improvements in optical properties.

Copolymers and terpolymers of propylene as described can also be blended to provide a material which improves the heat sealability of the film. Such materials include, for example, LDPE or ethylene-vinyl acetate (EVA), as well as other equivalent materials. Such dual function blends act not only as casting promoters but provide the resulting films with heat sealability, thereby avoiding the need to separately apply a heat seal skin layer. For example, Applicants have obtained beneficial results using blends of a propylene/ethylene copolymer and up to about 35 wt % LDPE or up to about 20 wt % EVA.

Such polyolefinic casting promoter materials have been found to promote the process of casting the high gauge HDPE sheets necessary for producing films with high biaxial orientation. The polyolefinic casting promoters, and in particular, the copolymers and terpolymers of propylene, have been found to permit use of substantially lower cast roll temperatures during the film casting process, while still providing a sheet which can be highly biaxially oriented as described herein. The propylene-based casting promoter materials have the additional advantage of also improving the optical characteristics of the film.

The casting promoter material is generally provided as a layer on at least one surface of the HDPE material prior to casting by means of co-extrusion. Preferably, the laminated co-extrudate includes at least about 80 wt % of the HDPE base material and up to about 20 wt % of the casting promoter layer or layers. In the resulting cast sheet, the HDPE material (optionally including one or more tie layers), constitutes at least about 80% of the thickness of the sheet, with the balance being the casting promoter layer(s). Moreover, in order to optimize the beneficial effect observed for the casting promoter, the casting promoter is preferably provided as a layer on either side of the HDPE material, providing a sheet with outer layers of the casting promoter and an inner core layer of HDPE (e.g., a structure ABA, in which A is the casting promoter and B is the HDPE base material). In a highly preferred embodiment, each outer layer of the casting promoter constitutes from about 1% to about 10% of the thickness of the sheet. The skilled artisan will appreciate that different casting promoter materials and/or different amounts of casting promoter materials can be employed in the same application if different properties are required of each of the sides of the sheet.

It can be observed that the method employed to produce a multilayer film having one or more casting promoter layer(s), the outermost layer can be either a skin layer or the casting promoter layer. For example, if a sheet is provided with a skin layer after casting, the outermost layer would be a skin layer applied to the outer surface of the casting promoter layer. This approach can be used to prepare a film having a structure CABAC, in which C is the skin layer, A is a casting promoter material, and B is the base HDPE material. Alternatively, a multilaminate film can be produced by co-extrusion in which the outermost layers are layers of the casting promoter, while an intermediate layer, e.g., a tie layer, contains a pigment. This approach can be used to create a film having a structure ACBCA, wherein A is the casting promoter, C is the tie layer, and B again is the base HDPE material. The skilled artisan will appreciate that other permutations are possible in formulating multilaminate films for particular purposes.

The following examples are provided to assist in a further understanding of the invention. The particular materials and conditions employed are intended to be further illustrative of the invention and are not limiting upon the reasonable scope thereof.

EXAMPLE 1

A series of film-making trials was performed to determine the capacity of HDPE films to be biaxially oriented. HDPE having a density of 0.958, and a melt index of 1.1 (Lyondell M6211), was used to prepare cast material using a conventional process, except that a high temperature (205° F.) cast roll (i.e, temperature of the water coolant in the roll) was used to enable handling of the relatively thick (<40 mil) cast materials. Combinations of orientation conditions were tested to examine the effects of imbalanced biaxial orientation. Specifically, orientation was performed by stretching the cast material to a degree of from 4.0:1 to 7.0:1 in the machine direction, at temperatures of from 255° F. to 275° F., and to a degree of from 7.0:1 to 9.5:1 in the transverse direction, at temperatures of from 250° F. to 320° F. Several exemplary tests are described in Table I, below.

TABLE I

| Sample | MDX | $T_{MDO}^1$ (° F.) | TDX | $T_{TDO}^2$ (° F.) | Comments |
| --- | --- | --- | --- | --- | --- |
| A | 4.0 | 260/255 | 7.0 | 320/260 | Very poor gauge profile |
| B | 5.7 | 275/275 | 9.5 | 294/250 | Some TD bands |
| C | 6.6 | 275/275 | 9.5 | 294/250 | Uniform gauge |
| D | 7.0 | 275/275 | 9.5 | 294/250 | Not operable |

[1]Preheat Temperature/Stretch Temperature.
[2]Preheat Zone Temperature/Stretch Zone Temperature.

The film of Sample A was made using orientation conditions which would be generally very good for making opaque oriented polypropylene (OPP) films, i.e., stretching 4 MDX and 7 TDX. However, the resulting film was of very poor quality, including having a very poor gauge profile. Specifically, the MD stretched sheet had strips of thick material aligned in the TD (TD bands), and the film at the TD orienter exit had these strips along with a wide strip of very thick material down its center (MD band). No temperature conditions were found that proved capable of imparting uniform gauge to films at this degree of biaxial orientation.

It was unexpectedly found, however, that increasing MDX served to lessen the severity of the TD bands. (The MDO temperature was increased to reduce slippage associated with the greater stress on the base material.) Accordingly, a series of runs was performed in which MDX was varied while MD orientation temperature (275° F.), TD stretching ratio (TDX=9.5), and TD orientation temperature (294/250° F.) were kept constant. From these tests, Samples B–D in Table I were obtained. It is seen that at an MDX of 5.7, the TD bands were decreased (Sample B), while uniform gauge was obtained using an MDX of 6.6 (Sample C). However, by further increasing the MDX toward 7.0 or above, the orientation process became inoperable inasmuch as the film was too splitty to permit TD stretch (Sample D).

The oriented film of Sample C not only exhibited superior gauge profile, but also possessed excellent tensile properties and stiffness associated therewith as tested by conventional methods known to the skilled artisan. Specifically, the MD tensile modulus was determined to be 440,000 psi, the TD tensile modulus was determined to be 860,000 psi, and the WVTR was determined to be 0.14 g/100 in²-24 hr (at 100° F. and 90% relative humidity). The dead-fold of the film of Sample C was also superior according to subjective evaluation.

From these results, it is clear that high biaxial orientation of a HDPE film requires specific conditions in order to obtain a film with desirable properties. Specifically, if the machine direction stretch (MDX) is either too high or too low, films with undesirable properties are created, and even completely unusable films can result. However, while the properties of the film of the invention are highly sensitive to MDX orientation, the film is substantially less sensitive to TDX, and retains its useful characteristics at higher TDX, e.g., substantially above 9:1 (data not shown).

EXAMPLES 2–7

Table II, below, summarizes a series of experiments illustrating features and advantages of the present invention. In each case, sheets were manufactured using conventional extrusion and casting equipment, and orientation was performed using conventional orienting equipment. In all of the experiments, the HDPE polymer was Lyondell M6211. When a copolymer (CP) was employed as the casting promoter, the copolymer was an ethylene-propylene copolymer 6573XHC (2% ethylene and 98% propylene), obtained from Fina Oil and Chemical Co., Dallas, Tex.; when a terpolymer (TP) was employed, the terpolymer was an ethylene-propylene-butylene terpolymer 7510 (3% ethylene, 93% propylene, and 4% butylene), obtained from Chisso Corp., Tokyo, Japan. The details particular to the individual experiments are explained in Examples 2–7, below.

TABLE II

| Sample | Cmpsn. (%) | Pin/Chill | $T_{Cast}$ (° F.) | MDX | $T_{MDO}^1$ (° F.) | TDX | $T_{TDO}^1$ (° F.) | WVTR² | Haze (%) | LT (%) | Gloss (%) | Gauge (mil) | Comments |
|---|---|---|---|---|---|---|---|---|---|---|---|---|---|
| E | HDPE | Electro | <190 | — | — | — | — | — | — | — | — | — | Inoperable (Curl, poor edges) |
| F | HDPE | Electro | 206 | 6.6 | 275/280 | 9.4 | 312/244 | 0.22 | 79 | — | 6 | 0.8 | |
| G | TP(2) | AK | 140 | 6.6 | 280/285 | 9.5 | 308/260 | 0.13 | 13 | — | 64 | 1.1 | |
| H | CP(2) | AK | 140 | 6.6 | 290/290 | 9.5 | 308/260 | 0.16 | 5 | — | 90 | 1.0 | |
| I | HDPE | Electro | 215 | 6.2 | 257/263 | 11 | 318/255 | 0.14 | 40 | — | 27 | 0.8 | |
| J | TP(3) | AK/WB | 120 | 6.0 | 250/250 | 11 | 319/260 | 0.19 | 26 | — | 32 | 0.7 | |
| K | CP(3) | AK | 120 | 6.0 | 260/270 | 11 | 325/262 | 0.30 | 7 | — | 85 | 0.8 | |
| L | TP(2) | AK/WB | 120 | 6.0 | 255/255 | 11 | 321/258 | 0.71 | — | 18 | 50 | 2.0 | Opaque³; Yield = 26,000 in²/lb |
| M | HDPE | AK | 210 | 6.6 | 275/280 | 9.5 | 298/252 | 0.17 | — | 82 | — | 0.8 | Pigmented⁴ |
| N | HDPE | AK/AC | 210 | 6.5 | 280/280 | 6.5 | 300/255 | — | — | — | — | — | MD Gauge Band |
| O | HDPE | AK/AC | 210 | 6.0 | 280/285 | 9.5 | 298/250 | — | — | — | — | 1.0 | |

HDPE = Lyondell M6211
TP = HDPE + Chisso 7510 Terpolymer
CP = HDPE + Fina 6573XHC Copolymer
Electro = Electrostatic Pinner
AK = Air Knife
WB = Water Bath
AC = Air Cap
¹Preheat/Stretch Temperatures
²g/100 in²-24 hr @ 100° F., 90% RH
³18% HDPE tie layer each side (4% $TiO_2$), 9% $CaCO_3$ in core
⁴10% Ampecet 11171 $TiO_2$ master batch in HDPE tie layer

EXAMPLE 2

Samples E and F in Table II illustrate a significant problem of the prior art which has been solved by means of the present invention. Specifically, Sample E was manufactured by using a cast roll set at under 190° F., a temperature similar to that used for preparing thinner HDPE sheets suitable for use in prior art low biaxial or monoaxial orientation processes. However, the resulting sheet was inoperable, i.e., incapable of being used in the high biaxial orientation process of the invention since it curled away from the cast roll and had uneven edges. Sample F, by contrast, was cast using cast rolls set at a temperature of 206° F. The resulting sheet was fully operable in the orientation process of the invention, inasmuch as it adhered to the cast roll and produced a good quality sheet with even edges. The sheet was stretched to a degree of 6.6:1 in the MD, and to a degree of 9.4:1 in the TD. The resulting film exhibited good WVTR properties and gauge profile (0.8 mil). Clearly, the use of a higher temperature cast roll is a effective solution to the problem of obtaining a sheet of dimensions and quality suitable for use in the high biaxial orientation process of the invention.

EXAMPLE 3

Samples F, G, and H together illustrate specific unexpected advantages obtained by employing a casting promoter material in casting the HDPE sheet. Sample F, mentioned above in Example 2, included no casting promoter, and required the use of a high temperature cast roll, i.e., 206° F. Samples G and H were cast as trilaminate sheets, each including a layer of casting promoter on either side of the HDPE core material. Each casting promoter layer constituted 2% of the total weight of the sheet. Specifically, Sample G included layers of a terpolymeric casting promoter, and Sample H included layers of a copolymeric casting promoter. In each case, the casting promoter layers permitted casting of the HDPE sheet at 140° F., a temperature reduction of over 60° F.

Both of the casting promoter materials yielded a sheet capable of high biaxial orientation according to the invention. Moreover, adding either of the casting promoter materials to the sheet imparted further unexpected beneficial properties to the final oriented films, including improved haze and gloss. The terpolymeric casting promoter employed in Sample G permitted production of a film having only 13% haze, compared to 79% haze in Sample F; and 64% gloss, compared to only 6% gloss in Sample F. Haze was evaluated according to ASTM D1003-92, and gloss was evaluated according to ASTM D2457-90 at a 45° angle. The copolymeric casting promoter performed even better with respect to film optical properties, providing a film (Sample H) in which haze was reduced to only 5%, and in which gloss was increased to 90%.

EXAMPLE 4

Three additional films, analogous to Samples F, G, and H described above in Example 3, were produced using other apparatus having different physical dimensions. Sample I is comparable to Sample F, again illustrating that a higher casting temperature permits production of a HDPE film having good WVTR properties and gauge profile. Samples J and K are comparable to Samples G and H, respectively, except that 3% of the casting promoter was employed in each layer rather than 2% as in the earlier samples. In this apparatus, the casting promoter permitted use of a casting temperature as low as 120° F., as contrasted against a casting temperature of 215° F. for Sample E, i.e., a temperature reduction of 95° F.

Once again, the casting promoters also improved the optical properties of the films. Specifically, the terpolymeric casting promoter reduced haze to only 26% in Sample J, as compared to 40% in Sample I; and increased gloss to 32%, as compared to 27% in Sample I. (These benefits were probably compromised to some extent by the use of a water bath to chill the cast sheet, a process which generally tends to degrade optical properties.) The copolymeric casting promoter used in Sample K improved the haze and gloss further, reducing haze to only 7% and increasing gloss to 85%.

EXAMPLE 5

Sample L described in Table II is exemplary of a cavitated film prepared according to the present invention. A multilaminate HDPE sheet having five layers was co-extruded. The core layer was HDPE containing 9 wt % calcium carbonate ($CaCO_3$) as a cavitant. The outer layers on either side of the film were 2% layers of the terpolymeric casting promoter. Between the core layer and the two outer casting promoter layers were tie layers (18% each) of the HDPE including 4% $TiO_2$ as a whitener.

The multilaminate sheet was then high biaxially oriented according to the invention, by stretching to a degree of 6.0 MDX and 11 TDX. Accordingly, the process parameters for preparing this film are comparable to those for Sample J described above. The resulting cavitated film gave a yield of 26,000 $in^2$/lb, and exhibited 18% light transmission. The gloss of this film was high, i.e., 50%, while WVTR was somewhat higher than for uncavitated film.

EXAMPLE 6

Sample M is exemplary of a pigmented film prepared according to the invention. A multilaminate film was prepared by co-extrusion to have five layers having a structure ACBCA. The core or base layer (B=83%) and the two outer layers (A=2.5% each) were of the same HDPE. The tie layers (C=6% each) between the core and the outer layers on either surface were of the HDPE containing 10 wt % of a mixture of 50%$TiO_2$ in a low density polyethylene (density= 0.914, melt index=7) (product number 11171 obtained from Ampacet Corp., Tarrytown, N.Y.). The pigmented sheet was biaxially oriented by stretching to 6.6 MDX and 9.5 TDX to provide a high biaxially oriented film according to the invention. The resulting film had excellent WVTR characteristics, and exhibited 82% light transmission.

EXAMPLE 7

Samples N and O illustrate advantages obtained by providing an orientation imbalance in the film of the invention. Sample N was a film prepared to have balanced orientation, i.e., 6.5 MDX and 6.5 TDX. Sample O was a film prepared from a sheet identical to that used for Sample N, but prepared to have an orientation imbalance, i.e., 6.0 MDX and 9.5 TDX; (The process conditions for casting and orienting the two films were substantially identical.) The balanced film (Sample N) exhibited a MD gauge band running down its center, causing wide fluctuation in gauge and preventing practical utility as a film. It has been observed that gauge in the TD cannot be made uniform when typical tentering conditions are used to make a film having balanced orientation. Sample O, by contrast, shows that gauge uniformity can be obtained by changing the mechanical orientation to provide imbalanced orientation. Sample O provided a film 1.0 mil thick, and having a highly uniform gauge profile.

Figure 1B:
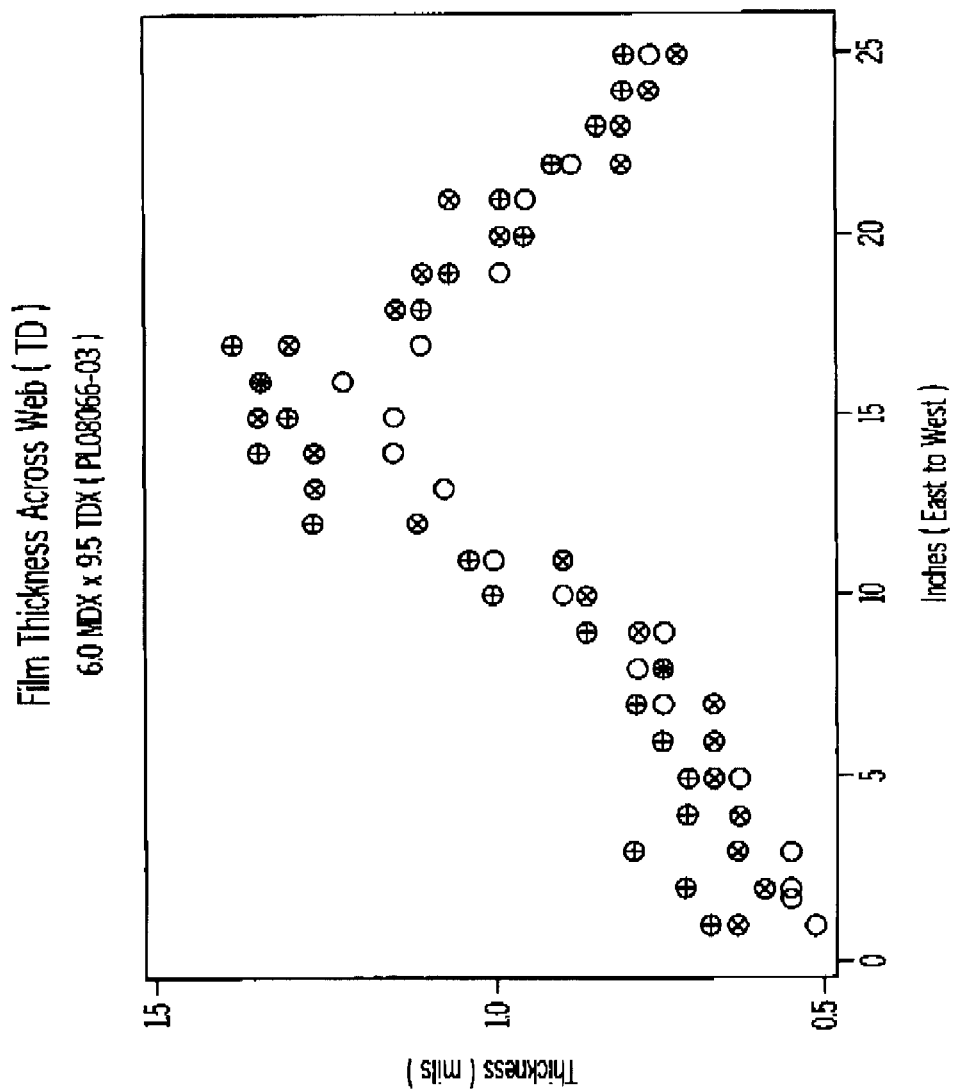
FIG. 1B is a graph illustrating the thickness of a film having imbalanced orientation also measured across its width and at three different points along its length.

The differences in gauge profile of Samples N and O are shown through comparison of FIGS. 1A (Sample N) and 1B (Sample O). Gauge profile in the transverse dimension was measured by means of a micrometer by taking sets of 25 measurements spaced 1" apart along a 24" section in the center of the film. FIGS. 1A and 1B show sets of gauge measurements taken at three different positions along the length of the films. The film of Sample N was 36" wide, while the film of Sample O was 55" wide. Clearly, the film having balanced orientation (Sample N; FIG. 1A) exhibited wide variability in gauge, while the film having imbalanced orientation (Sample O; FIG. 1B) exhibited substantially uniform gauge, demonstrating another benefit obtained through the method of the invention.

EXAMPLE 8

A biaxially oriented film (Sample H of Example 3) was produced, according to the method of the invention, as follows: HDPE (Lyondell M6211) was extruded through a 2.5" diameter main extruder at 490° F. at 130 rpm. Two 1.5" diameter satellite extruders operating at 460° F. and 22 rpm, extruded a copolymer of propylene and ethylene (Fina 6573XHC). The extrudates were fed through a three layer melt adaptor into a die, both set at 480° F., to provide a three-layer (i.e., ABA structure) co-extrudate. The co-extrudate was then cast onto a chillroll running at 140° F. with no water bath. The cast sheet was then fed into the MD orientation apparatus consisting of pre-heat, stretch and annealing rolls. MD orientation was accomplished using a pre-heat temperature of 290° F. and a stretch temperature also of 290° F. Post MD orientation annealing was performed at 230° F. TD orientation in a tenter frame apparatus was performed using a pre-heat temperature of 308° F. and a stretch temperature of 260° F., The TD drive operated at 67 ft/min. Immediately following TD stretch, annealing was performed at 240° F. Following orientation, the thick edges of the film, that had been gripped in the tenter clips, were trimmed off. For convenience, the web was trimmed from a width of 57½" to a width of 26⅛". The film was then corona-treated on one side to a wetting tension of 36 dyn/cm², and wound on a roll.

EXAMPLE 9

Biaxially oriented films were prepared according to the invention using several LDPE-containing materials as casting promoters. HDPE (Lyondell M-6211) was co-extruded with several LDPE-containing materials and the resulting sheets were subjected to orientation by stretching to a degree of 6.6 in the MD and to a degree of 9.4 in the TD. The casting promoter material was included as layers on either side of the HDPE core, each layer constituting 3% of the total thickness of the cast sheet. The physical data obtained from these experiments are summarized in Table III.

TABLE III

| Sample | Casting Promoter | $T_{Cast}$ (° F.) | $T_{MDO}$ (° F.)* | $T_{TDO}$ (° F.)* |
|---|---|---|---|---|
| P | 25% HDPE | 150 | 245/245 | 306/260 |
| Q | 10% HDPE | 150 | 245/245 | 306/260 |
| R | 5% HDPE | 150 | 245/245 | 306/260 |
| S | 100% LDPE | 150 | 220/238 | 302/260 |

*Preheat/Stretch temperatures

The formulations of the casting promoter materials employed LDPE (Chevron 1017: density=0.918; melt index=6.9, obtained from Chevron Chemical Co., Houston, Tex.) admixed with different proportions (0–25 wt %) of HDPE (Lyondell M-6211). In addition, Samples P–R contained 16% polystyrene (BASF 1800 obtained from BASF Corp., Mt. Olive, N.J.) in the HDPE core as a cavitant. The presence of the polystyrene had only negligible effect on casting performance and stretch uniformity.

Samples P–S show that a sheet can be cast using low density polyethylene materials as casting promoters. Samples P–R, in particular, prove that the addition of a small amount of HDPE to LDPE produces excellent casting promotion, permitting casting at only 150° F. The films yielded in Samples P–R had excellent gauge profile and good physical characteristics. It was found that, when 100 wt % LDPE, was used (Sample S), the MDO temperatures should be kept somewhat lower to prevent sticking of the sheet to the MDO rolls. At these lower temperatures, it is more difficult to uniformly stretch the film.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. An imbalanced biaxially oriented high density polyethylene (HDPE) film having a greater degree of orieniation in the transverse direction than in the machine direction and consisting of a layer of HDPE, wherein said film:
   (a) has a density of at least 0.940 g/cm³;
   (b) has a melt index of from about 0.5 to about 10 g/10 minutes;
   (c) has been stretched in the solid state to a degree of from about 6:1 to about 8:1 in the machine direction at a temperature of from about 140° F. (60° C.) to about 320° F. (160° C.);
   (d) has been stretched in the solid state to a degree of from about 6:1 to about 15:1 in the transverse direction at a temperature of from about 230° F. (110° C.) to about 320° F. (160° C.); and
   (e) has not been crosslinked.

2. An imbalanced biaxially oriented high density polyethylene (HDPE) film having a greater degree of orientation in the transverse direction than in the machine direction, comprising a base layer consisting of (i) HDPE and, optionally, (ii) one or more of an antioxidant, filler, particulate, dye, pigment, light stabilizer, heat stabilizer, anti-static agent, slip agent, anti-blocking agent, abrasive, an opacifing agent, and a cavitating agent, a first casting promoter layer on a first side of the base layer, and a second casting promoter layer on a second side of the base layer opposite the first side, wherein
   the HDPE of the base layer has a density of at least 0.940 g/cm³ and a melt index of from about 0.5 to about 10 g/10 minutes,
   the base layer represents from about 70% to about 95% of the thickness of the film,
   the film has been stretched in the solid state to a degree of from about 6:1 to about 8:1 in the machine direction at a temperature of from about 140° F. (60° C.) to about 320° F. (160° C.), and
   the film has been stretched in the solid state to a degree of from about 6:1 to about 15:1 in the transverse direction at a temperature of from about 230° F. (110° C.) to about 320° F. (160° C.).

3. The imbalanced biaxially oriented HDPE film of claim 2, wherein the film is stretched to a degree of from about 6:1 to about 7:1 in the machine direction.

4. The imbalanced biaxially oriented HDPE film of claim 2, wherein the film is stretched to a degree of from about 6:1 to about 6.5:1 in the machine direction.

5. The imbalanced biaxially oriented HDPE film of claim 2, wherein the film is stretched to a degree of from about 9:1 to about 13:1 in the transverse direction.

6. The imbalanced biaxially oriented HDPE film of claim 2, wherein the film is stretched to a degree of from about 6:1 to about 7:1 in the machine direction, and to a degree of from about 9:1 to about 13:1 in the transverse direction.

7. The imbalanced biaxially oriented HDPE film of claim 2, wherein the HDPE of the base layer has a density of at least 0.950 g/cm³.

8. The imbalanced biaxially oriented HDPE film of claim 2, wherein at least one of the first casting promoter layer and the second casting promoter layer is a polyolefin having a rate of crystallization and a crystallinity lower than that of the HDPE of the base layer.

9. The imbalanced biaxially oriented HDPE film of claim 2, wherein at least one of the first casting promoter layer and the second casting promoter layer comprises a propylene copolymer or terpolymer comprising (i) at least 80% propylene and (ii) at least one other alpha olefin.

10. The imbalanced biaxially oriented HDPE film of claim 9, wherein at least one of the first casting promoter layer and the second casting promoter layer further comprises a material which improves heat sealability.

11. The imbalanced biaxially oriented HDPE film of claim 10, wherein the material which improves heat sealability is a low density polyethylene or an ethylene-vinyl acetate.

12. The imbalanced biaxially oriented HDPE film of claim 6, wherein at least one of the first casting promoter layer and the second casting promoter layer comprises an ethylene-propylene copolymer comprising about 98% propylene and about 2% ethylene or an ethylene-propylene-butylene terpolymer comprising about 3% ethylene, about 93% propylene, and about 4% butylene.

13. The imbalanced biaxially oriented HDPE film of claim 2, wherein at least one of the first casting promoter layer and the second casting promoter layer comprises a medium density polyethylene or a blend of a low density polyethylene and a high density polyethylene.

14. The imbalanced biaxially oriented HDPE film of claim 2, wherein an outer surface of at least one of the first casting promoter layer and the second casting promoter layer has a skin layer applied thereon.

15. The imbalanced biaxially oriented HDPE film of claim 14, wherein the skin layer is a heat seal layer.

16. The imbalanced biaxially oriented HDPE film of claim 15, wherein the heat-seal skin layer comprises an ethylene-vinyl acetate copolymer or an ethylene-methacrylic acid salt ionomer.

17. The imbalanced biaxially oriented HDPE film of claim 14, wherein the skin layer is an ink-receptive layer.

18. The imbalanced biaxially oriented HDPE film of claim 2, wherein the HDPE of the base layer is a single HDPE resin or a mixture of HDPE resins each having a density of at least 0.940 g/cm$^3$ and a melt index of from about 0.5 to about 10 g/10 minutes.

19. The imbalanced biaxially oriented HDPE film of claim 2, wherein an outer surface of at least one of the first casting promoter layer and the second casting promoter layer has a coating applied thereon.

20. The imbalanced biaxially oriented HDPE film of claim 19, wherein the coating is applied in-line.

21. The imbalanced biaxially oriented HDPE film of claim 19, wherein the coating is applied off-line.

22. The imbalanced biaxially oriented HDPE film of claim 2, wherein an outer surface of at least one of the first casting promoter layer and the second casting promoter layer is flame- or corona-treated.

23. The imbalanced biaxially oriented HDPE film of claim 2, wherein an outer surface of at least one of the first casting promoter layer and the second casting promoter layer is metallized.

24. The imbalanced biaxially oriented HDPE film of claim 2, wherein at least one of the first casting promoter layer and the second casting promoter layer comprises one or more of an antioxidant, filler, particulate, dye, pigment, light stabilizer, heat stabilizer, anti-static agent, slip agent, anti-blocking agent, abrasive, an opacifying agent, and a cavitating agent.

25. The imbalanced biaxially oriented HDPE film of claim 2, wherein the cavitating agent is present in the base layer in an amount of from about 5 wt % to about 25 wt %, based on the weight of the base layer.

26. The imbalanced biaxially oriented HDPE film of claim 25, wherein the cavitating agent is calcium carbonate or polystyrene.

27. The imbalanced biaxially oriented HDPE film of claim 2, wherein the base layer represents from about 80% to about 95% of the thickness of the film.

28. A method of making an imbalanced biaxially oriented high density polyethylene (HDPE) film having a greater degree of orientation in the transverse direction than in the machine direction, wherein the film comprises a base layer consisting of (i) HDPE and, optionally, (ii) one or more of an antioxidant, filler, particulate, dye, pigment, light stabilizer, heat stabilizer, anti-static agent, slip agent, anti-blocking agent, abrasive, an opacifying agent, and a cavitating agent, a first casting promoter layer on a first side of the base layer, and a second casting promoter layer on a second side of the base layer opposite the first side, the HDPE of the base layer has a density of at least 0.940 g/cm$^3$ and a melt index of from about 0.5 to about 10 g/10 minutes, and the base layer represents from about 70% to about 95% of the thickness of the film, the method comprising the steps of coextruding the base layer, first casting promoter layer, and second casting promoter layer to form a coextrudate, casting the coextrudate to provide a sheet, and biaxially orienting the sheet by stretching the sheet in the solid state to a degree of from about 6:1 to about 8:1 in the machine direction and to a degree of from about 6:1 to about 15:1 in the transverse direction.

29. The method of claim 28, wherein the sheet is stretched in the machine direction to a degree of from about 6:1 to about 7:1.

30. The method of claim 29, wherein the sheet is stretched in the machine direction to a degree of from about 6.0:1 to less than 6.5:1.

31. The method of claim 29, wherein the sheet is stretched in the transverse direction to a degree of from about 9:1 to less than 13:1.

32. The method of claim 28, wherein the sheet is stretched in the machine direction to a degree of from about 6:1 to about 7:1 and stretched in the transverse direction to a degree of from about 9:1 to about 13:1.

33. The method of claim 28, wherein the biaxial orienting comprises sequentially stretching the sheet in the machine direction and then in the transverse direction.

34. The method of claim 28, wherein the biaxial orienting comprises simultaneously stretching the sheet in the machine and transverse directions.

35. The method of claim 28, further comprising the step of applying a coating to an outer surface of at least one of the first casting promoter layer and the second casting promoter layer.

36. The method of claim 28, further comprising the step of flame- or corona-treating at least one of the first casting promoter layer and the second casting promoter layer.

37. The method of claim 28, further comprising the step of metallizing an outer surface of at least one of the first casting promoter layer and the second casting promoter layer.

38. An imbalanced biaxially oriented high density polyethylene (HDPE) film having a greater degree of orientation in the transverse direction than in the machine direction, comprising a base layer consisting of (i) HDPE and, optionally, (ii) one or more of an antioxidant, filler, particulate, dye, pigment, light stabilizer, heat stabilizer, anti-static agent, slip agent, anti-blocking agent, abrasive, an opacifying agent, and a cavitating agent, a first casting promoter layer on a first side of the base layer, and a skin layer on a second side of the base layer opposite the first side, wherein the HDPE of the base layer has a density of at least 0.940 g/cm$^3$ and a melt index of from about 0.5 to about 10 g/10 minutes, the base layer represents from about 70% to about 95% of the thickness of the film, the film has been stretched in the solid state to a degree of from about 6:1 to about 8:1 in the machine direction at a temperature of from about 140° F. (60° C.) to about 320° F. (160° C.), and the film has been stretched in the solid state to a degree of from about 6:1 to about 15:1 in the transverse direction at a temperature of from about 230° F. (110° C.) to about 320° F. (160° C.).

39. An imbalanced biaxially oriented high density polyethylene (HDPE) film having a greater degree of orientation in the transverse direction than in the machine direction, comprising:

a base layer consisting of (i) a blend of HDPE and a polymer selected from the group consisting of low density polyethylene (LDPE), ultra-low density polyethylene (ULDPE), linear low density polyethylene (LLDPE), polystyrene, styrene-butadiene copolymer, and polyvinyl acetate, and, optionally, (ii) one or more of an antioxidant, filler, particulate, dye, pigment, light stabilizer, heat stabilizer, anti-static agent, slip agent, anti-blocking agent, abrasive, an opacifying agent, and a cavitating agent, a first casting promoter layer on a first side of the base layer, and a second casting promoter layer on a second side of the base layer opposite the first side, wherein the HDPE of the base layer has a density of at least 0.940 g/cm$^3$ and a melt index of from about 0.5 to about 10 g/10 minutes, the base layer represents from about 70% to about 95% of the thickness of the film, the film has been stretched in the solid state to a degree of from about 6:1 to about 8:1 in the machine direction at a temperature of from about 140° F. (60° C.) to about 320° F. (160° C.), and the film has been stretched in the solid state to a degree of from about 6:1 to about 15:1 in the transverse direction at a temperature of from about 230° F. (110° C.) to about 320° F. (160° C.).

40. The imbalanced biaxially oriented HDPE film of claim 39, wherein the blend (i) in the base layer at least 50 wt % HDPE.

41. The imbalanced biaxially oriented HDPE film of claim 39, wherein the blend (i) in the base layer at least 90 wt % HDPE.

* * * * *